(12) United States Patent
Ferguson

(10) Patent No.: US 6,178,829 B1
(45) Date of Patent: Jan. 30, 2001

(54) REDUNDANT LINKAGE AND SENSOR ASSEMBLY

(75) Inventor: J. Philip Ferguson, Thousand Oaks, CA (US)

(73) Assignee: Kavlico Corporation, Moorpark, CA (US)

( * ) Notice: Under 35 U.S.C. 154(b), the term of this patent shall be extended for 0 days.

(21) Appl. No.: 09/342,365

(22) Filed: Jun. 29, 1999

(51) Int. Cl.$^7$ ........................................... G01L 1/26
(52) U.S. Cl. ........................................ 73/862.391; 73/855
(58) Field of Search ....................... 73/862.381, 862.391, 73/862.392, 855, 862.621

(56) References Cited

U.S. PATENT DOCUMENTS

| | | | |
|---|---|---|---|
| 4,717,384 | * | 1/1988 | Waldeisen ............................ 604/143 |
| 5,140,927 | * | 8/1992 | Tolefson ............................... 114/244 |
| 5,410,920 | * | 5/1995 | Westwick ............................. 73/866.5 |
| 5,470,090 | * | 11/1995 | Stewart et al. ...................... 280/276 |

OTHER PUBLICATIONS

McKenna, James T., *Safety Board Debates 737 Rudder Fixes*; Aviation Week & Space Technology, Mar. 22, 1999, pp. 26–27.

* cited by examiner

*Primary Examiner*—Max Noori
(74) *Attorney, Agent, or Firm*—Oppenheimer Wolff & Donnelly

(57) ABSTRACT

A redundant linkage and sensor assembly which includes a sensor that enables indication of the magnitude and direction of forces applied to the linkage, while maintaining full mechanical strength and function of the linkage. The linkage includes an inner first tube and an outer second tube arranged to move in telescoping fashion, a spring being connected between the outer tube and the inner tube. Within the outer tube the inner tube is connected to a stop assembly also connected to the outer tube, which stop assembly limits movement of the inner tube with respect to the outer tube to a selected range. A position sensor is also connected between the two tubes within the second tube to provide a signal indicative of relative movement. Whereby the axial forces on the linkage are monitored as the signal from the position sensor is related to movement in a known way and movement is related to applied force through the spring in a known way. If the spring should fail, forces are still transferred through the linkage due to the stops limiting relative movement of the tubes.

20 Claims, 3 Drawing Sheets

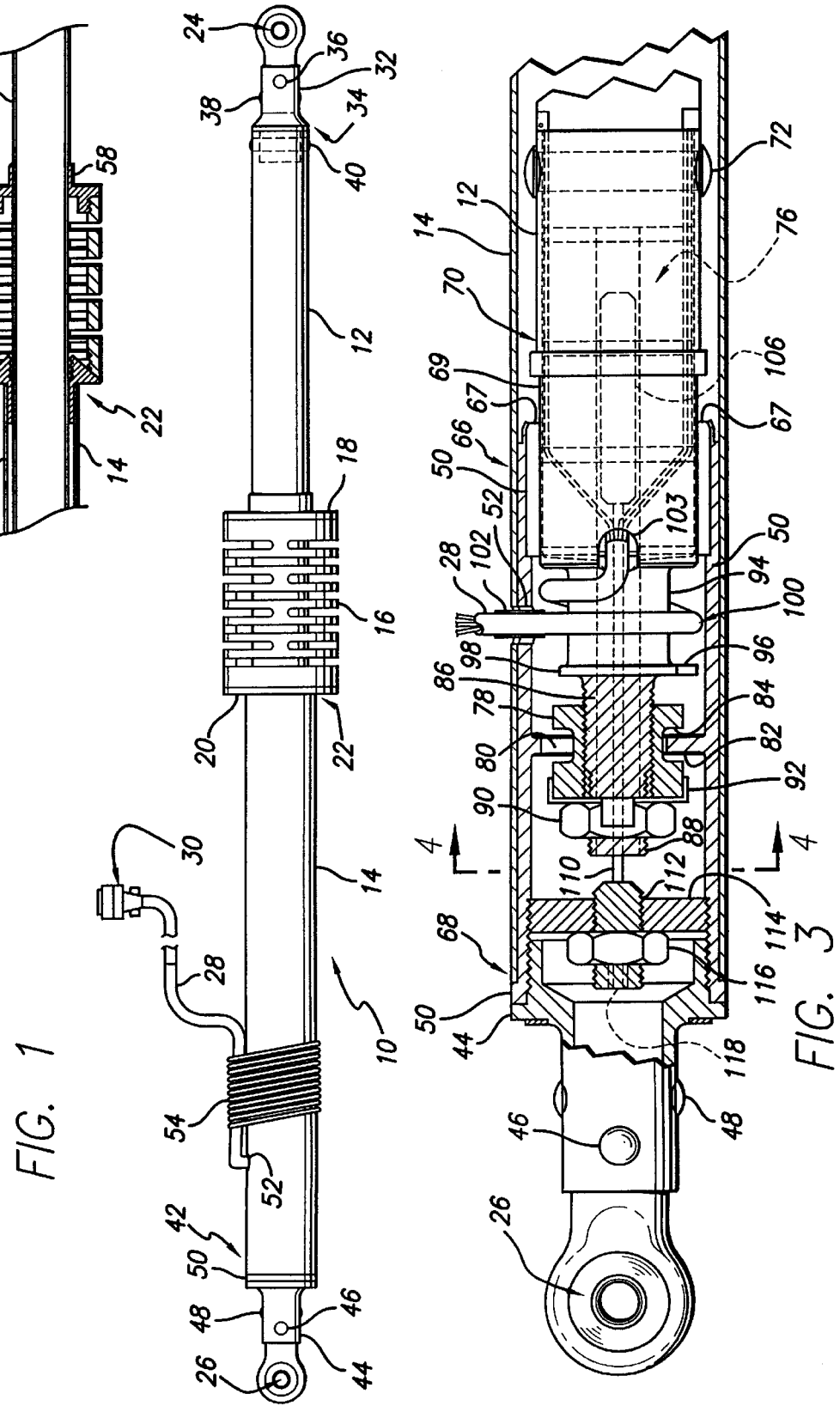

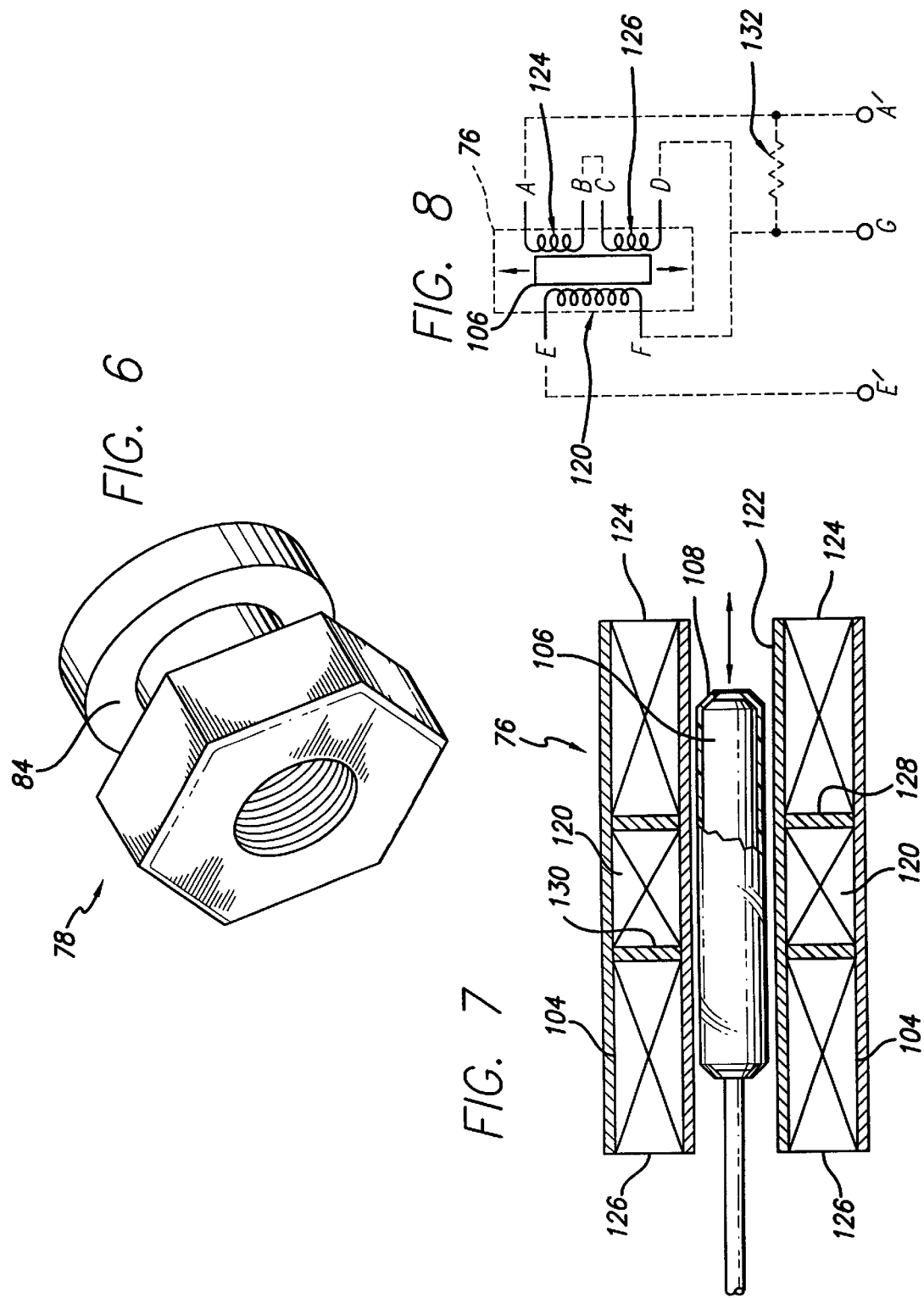

REDUNDANT LINKAGE AND SENSOR ASSEMBLY

BACKGROUND OF THE INVENTION

This invention relates to monitoring and control systems. More specifically, the invention relates to a fail-safe redundant linkage and sensor assembly for sensing forces applied to the linkage while maintaining functionality of the linkage.

In connection with issues discussed in an article entitled "Safety Board Debates 737 Rudder Fixes", Aviation Week & Space Technology, Mar. 23, 1999, pp. 26–27, there is considerable discussion as to the possibility and probable cause of a 737 rudder control system failure. In order to more clearly ascertain the causes of problems, if any, which may arise in the future, it is considered desirable to monitor the forces applied to a certain control linkage. However, it is also important that the mechanical strength of the linkage not be impaired.

One way that this may be accomplished is to attach conventional strain gauges to the linkage. However, the strain engendered by the forces involved (in the range of zero to several hundred ponds) in linkages deemed adequate from a structural standpoint, is quite small. Problems of obtaining sufficient signal to noise ratio with conventional strain gauges, as well as problems of de-lamination and drift of such gauges over time, makes sensing forces with such conventional gages problematic. For at least these reasons an alternative to sensing force by means of conventional strain gages is desirable.

SUMMARY OF THE INVENTION

Accordingly, a principal object of the present invention is to provide linkage assembly which includes a sensor that enables indication of the magnitude and direction of forces applied to the linkage, while maintaining full mechanical strength of the linkage and stable and accurate force readings over time using a non-standard method of sensing the force applied to the linkage. The redundant linkage and sensor assembly for monitoring axial force applied to the linkage comprises a first end bearing and a second end bearing and a first mechanical force transmitting path between the first and second end bearings. The first mechanical force transmitting path comprises an elastically deformable member allowing relative movement between the first and second end bearings in directions toward and away from each other. The elastically deformable member has a known relationship between elastic deformation and applied force. The assembly comprises a second mechanical force transmitting path which is configured to transmit mechanical force between the first and second end bearings, said second mechanical force transmitting path comprising a stop limiting relative movement of the first and second end bearings toward and away from each other to a range of relative axial movement. Lastly the assembly comprises a position sensor configured to sense the change in the distance between the first and second end bearings; whereby the applied axial forces acting through the first mechanical force transmitting path are monitorable within said range of relative axial movement using the change in the distance between the first and second end bearings sensed by the position sensor and the known relationship of deformation of the elastically deformable member to applied force, and whereby redundancy in mechanical operation of the linkage is provided by the second force transmitting path.

In a more detailed aspect, and in accordance with a preferred illustrative embodiment of the invention, a linkage includes first and second elongated metal tubes with the first of these tubes extending into the second tube which has an inner diameter slightly greater than the outer diameter of the first tube. An elastically deformable element, comprising a high strength cylindrical spring in the illustrative embodiment, has one end secured to an intermediate location of the first tube, and its other end secured to one end of the larger diameter second tube. The smaller tube extends within the larger tube in a telescoping fashion. The end of the first tube located within the second tube is coupled to the second tube by a position sensor assembly. As the force applied to the linkage changes, the spring expands or contracts and the ends of the two tubes at the location of the sensor assembly are displaced with respect to each other. The position sensor senses this relative position shift between the first and second tubes and provides a changed electrical output signal indicating the direction and magnitude of the position change. This is because the relative position of the ends of the tubes at the position sensor assembly are related to the applied force on the linkage by the relationship of the deformation of the spring to applied force, the applied force is indicated by the output signal.

In a further detailed aspect, as the first tube is redundantly connected to the second tube via the sensor assembly, as the sensor assembly includes structure comprising a redundant mating stop assembly. The mating stop assembly allows the small relative movement necessary for sensor assembly function over the desired applied force range, but provides a redundant mechanical interference so that even if the spring fails or becomes loosened from one of the tubes, the linkage assembly will still be operative.

In a preferred embodiment, the relative position sensor uses a linear variable differential transformer (LVDT). A movable armature (core) is secured to one of the tubes and the primary and secondary transformer coils are secured to the other tube. Relative axial movement of the tubes results in relative movement of the armature with respect to the coils. This changes the output through the secondary coils of the LVDT. A one-time calibration procedure can be used to improve the accuracy of the force indication, a resistor being installed across the secondary to optimize the output voltage of the LVDT to a selected value at a known selected applied force.

In a further detailed aspect, a primary coil of the LVDT is positioned intermediate two secondary coils, the armature being positioned so that when no tension or compression force is applied to the linkage the armature is centered and the voltage output through the secondary coils is equal. In a further detailed aspect, in a preferred embodiment the coils are wound in opposite directions, so as to be 180 degrees out of phase; and connected in series. In this embodiment when the armature is centered the net voltage output through the secondary is zero, and when the linkage is in compression the magnitude of the force is indicated as a positive voltage value, and when in tension as a negative voltage value.

In a further detailed aspect, temperature effects on the sensor are minimized by selecting the spring and the LVDT so that the change in stiffness in the spring over the service temperature range approximates the change in output (gain increase or drop) from the LVDT due to temperature changes over the same service temperature range, but opposite in direction so as to cancel out, insofar as possible, the two sources of error.

As will be appreciated, the fail-safe redundant linkage and sensor assembly replaces a structural member in a control system with a combination sensor and structural member.

For this reason all joints and members in the assembly have redundancy, so that if one fails there is a back-up structure to fulfill the structural requirement of the failed joint or member. Moreover, the sensor must be robust, and is designed for stability and a long service life. The linear variable differential transformer, being an AC device, is inherently more stable than DC strain gauges and the like, and drift over time is minimal.

Further details and advantages of the redundant linkage will be apparent from the following detailed description, taken together with the accompanying drawing figures, which illustrate, by way of example, principles of the invention; and with reference to the appended claims.

DESCRIPTION OF THE DRAWINGS

FIG. 1 is a side elevation view of a fail-safe redundant linkage and sensor assembly illustrating principles of the invention;

FIG. 2 is a cross section view taken in the plane of FIG. 1 of a portion of the redundant linkage and sensor assembly of FIG. 1;

FIG. 3 is a side elevation view, partially in cut-away, partially in cross section, showing in more detail a portion of the redundant linkage of FIG. 1;

FIG. 6 is a perspective view of an adjustable stop of the position sensor assembly of the redundant linkage of FIG. 3;

FIG. 7 is a schematic representation of the linear variable transformer of the position sensor assembly shown in FIG. 3; and FIG. 8 is an electrical schematic diagram of the linear variable transformer of the position sensor assembly shown in FIG. 3.

DETAILED DESCRIPTION OF THE INVENTION

Figure 4:
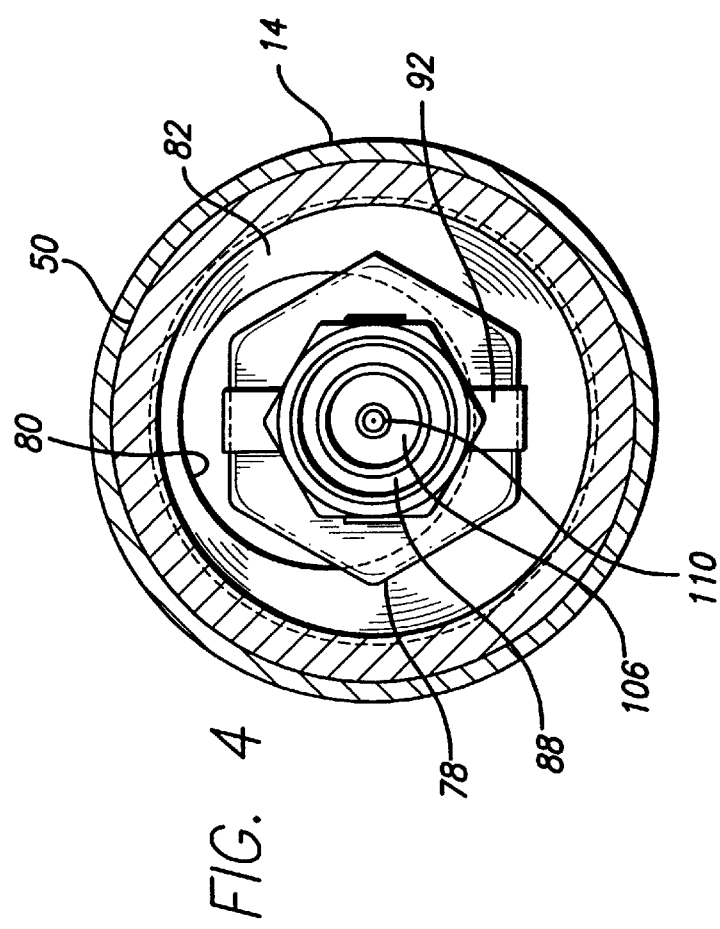
FIG. 4 is a cross section view, taken along line 4—4 in FIG. 3 of the redundant linkage shown in FIG. 3.

With reference to FIG. 1 of the drawings, which are provided for purposes of illustration and not by way of limitation of the scope of the invention, a fail-safe redundant linkage and sensor assembly 10 illustrating principles of the invention is shown. The linkage includes a first tube 12 and a second tube 14, the first tube having an outer diameter slightly smaller than an inner diameter of the second tube and the first tube extending into the second tube in telescoping fashion. An elastically deformable member comprising in the illustrated embodiment a cylindrical spring 16 is attached to the first tube by a first flange 18 attached to the first tube and a second flange 20 attached to the second tube 14 at a first end 22 of the second tube. As axial tension and compression forces are applied to the linkage through end bearings 24, 26 the spring lengthens or shortens a small amount, and a small relative movement between the first and second tube is allowed. The properties of the spring with regard to deflection per unit of applied force being known, the displacement of the tubes is recorded by an internal position sensor assembly (FIG. 2) and an output signal indicative of applied force is sent via an electrical cable 28 and connector 30.

The end bearings 24, 26 are a ball-and-socket type transferring only axial forces to the redundant linkage 10. A first end bearing 24 is attached to the first tube 12 at a first end 34 of the first tube via a first end fitting 32. Two shear pins 36, 38 hold the bearing in the fitting, while a weld secures the fitting to first tube. A third shear pin 40 provides a redundant load path. Other means of connection, such as adhesives, welding or braising can replace or supplement the shear pins. On the other end of the redundant linkage, the second end bearing 26 is attached to a second end 42 of the second tube 14 via a second end fitting 44 by shear pins 46, 48. The second end fitting is attached via a threaded connection (not shown) to an adapter 50 fitted into the second end of the second tube. The end fitting is also spot-welded to the adapter to prevent rotation around the threads. Welding and braising and adhesives are also supplemental and/or alternative attachment means for the elements holding this end second bearing to the linkage.

The electrical cable 28 exits the second tube 14 via a hole 52 formed therein for the purpose. The cable is bound to the linkage for strain relief by a nylon lace 54 and this is overpainted by PR1750 sealant made by PRC-DeSoto International, Inc. of Glendale, Calif., to hold it in place. The redundant linkage sensor assembly is shown with the end bearings 24, 26 aligned for clarity of illustration, however, the bearings on such a linkage for a Boeing 737 are turned 90 degrees from each other.

With reference to FIG. 2, which shows the connection of the first and second tubes 12, 14 by the spring 16 in greater detail, the flange 18 includes a threaded sleeve extension 56 which engages corresponding threads on the interior of the spring. The spring is also welded to the flange after assembly to prevent the spring turning with respect to the flange. The flange member 18 further includes a sleeve portion 58 joined to the exterior of the first tube by braising and/or welding.

The second flange member 20 likewise includes a threaded sleeve extension 60 which engages threads on the interior of the spring 16 and is also welded to the spring as at the opposite end of the spring. The threaded extension differs however, in that it is swaged to capture a bushing 62 formed of glass-filled nylon which under light lateral loads does not engage the first tube 12, but will prevent significant lateral movement between the tubes at the first end 22 of the second tube 14 if a significant lateral load is applied, while at all times allowing axial relative movement. The flange member 20 has a sleeve portion 64 that engages the interior of the second tube, and is joined thereto by welding and/or braising.

With reference to FIGS. 1 and 2, it will be appreciated that machining alternating slots in a length of tubing forms the spring 16. Such a spring has a relatively straight-line response in terms of deflection per unit of applied axial force within the elastic range of the material. Here all components are formed of metal, preferably a corrosion resistant steel alloy or aluminum. In a currently preferred embodiment the first and second tubes are formed of 304 L low carbon ¼ hard steel alloy. The spring is formed of 15-5 PH 1025 heat-treated steel alloy. In order to decrease weight a titanium alloy spring and higher strength steel tubing and fittings can be used.

With reference to FIG. 3, the adapter 50 fits inside the second tube 14, and is attached thereto by welding, braising or another conventional means. The adapter includes a bushing 67 which is captured therein by swaging. The busing is formed of glass-filled Nylon and functions in a manner similar to that described above (62 in FIG. 2). The position sensor assembly 66 includes, in addition to the first adapter 50 attached to a second end 68 of the second tube 14, a further or second adapter 69 attached to a second end 70 of the first tube 12 by welding or brazing, and by a pin 72 which provides a redundant load path. The adapter is slidably received in the bushing 67 of the first adapter.

The second adapter 69 has two significant functions. First, it houses an LVDT 76. Second, it cooperates with the first adapter 50 and a stop nut 78 to provide a redundant mechanical interference preventing the first and second tubes 12,14 from moving relative to one another in an axial direction more than about 77 thousandths of an inch from a zero force position. Thus, in the event of an excessive axial force being applied, the spring 16 is protected from damage by over-stressing and deformation beyond the elastic limit. Moreover, the linkage 10 will still be functional, even in the event of a failure of the spring 16 or flange members 18, 20 or welds connecting them to the first and second tubes.

With reference to FIGS. 3, 4 and 6, the stop nut 78 slips through an off-centered opening 80 defined by an inwardly extending flange 82 of the first adapter 50 during assembly. Thereafter the stop nut is adjusted to position an annular slot 84 in the stop nut in alignment with the inwardly extending flange, which interferes with and prevents movement of the stop nut and thereby the second adapter 69 beyond the limits defined by the width of the slot 84.

The second adapter 69 has a treaded extension portion 86 of a first diameter for threadably receiving the stop nut 78, and a further threaded extension portion 88 of a second, smaller, diameter extending beyond the first treaded extension portion. The later smaller diameter threaded extension portion receives a locking nut 90 which applies pressure to the stop nut 78 to lock it so as to prevent rotation of the stop nut, which can cause the allowable displacement range between the stop nut 78 and the inwardly extending flange 82 to shift to an imbalance. A retaining clip 92 is provided to keep the stop nut 78 from rotating with respect to the second adapter 69 and thereby shifting position in an axial direction.

The clearance between the inwardly extending flange 82 and the sides of the annular slot 84 is about 77 thousandths on either side of the inwardly extending flange. This gives a range of relative movement between the first and second tubes up to about 154 thousandths of an inch, which is more than the relative movement of the first and second tubes within the range of applied axial forces anticipated for the linkage in an aircraft tail control system, an application for the illustrated embodiment.

The second adapter 69 further comprises an extension 94 and flange 96 adapted to receive the electrical cable 28 wrapped around it, to provide strain relief for the cable. In practice during assembly the electrical cable is fed through the hole 52 in the second tube 14 and the first fitting 50 and pulled out as the first tube 12 is slipped into the second tube. A portion of the flange 96 is removed at a location 98 so that the cable 28 can get by as the first tube is inserted into the second tube. After insertion the tubes are twisted relative to one another to provide a strain relief portion of the cable 100 wrapped around the extension 94 of the second adapter 69. A further protective sleeve 102 is placed over the cable at the location where it passes through the hole 52.

Figure 5:
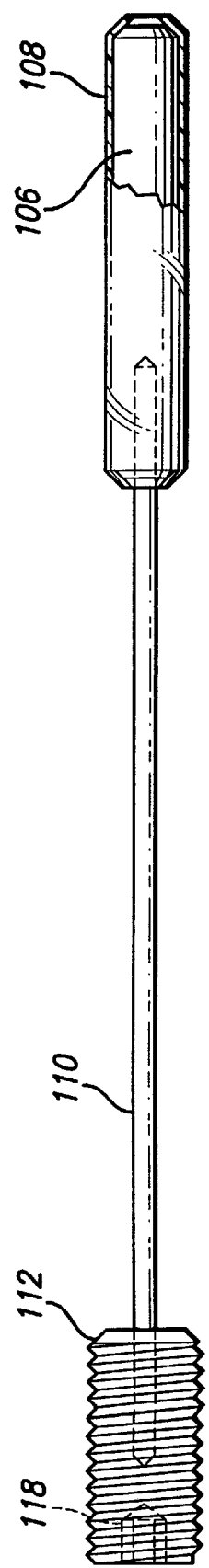
FIG. 5 is a side elevation view of an armature assembly and positionably adjustable rod portions of a linear variable transformer assembly of the linkage shown in FIG. 3.

The electrical cable 28 contains three leads connected to the primary, secondary and ground of the LVDT 76. As mentioned the LVDT is positioned within the second adapter and the second adapter defines a hole 103 for this purpose. A shield 104 (FIG. 5) is disposed around the LVDT primary and secondary coils to minimize electrical interference. Suitable LVDTs are commercially available from Kavlico Corporation, Moorpark, Calif.

With reference to FIGS. 3 and five, a nickel-iron armature 106 resides within the LVDT within the second adapter 69, but is free to slidably move therein. A Teflon sleeve 108 protects the armature from cold working caused by vibration. Cold working reduces permeability of the armature. The Teflon sleeve also facilitates sliding movement, particularly in inhibiting jamming caused by ice. A K-monel alloy rod ties the armature to the first adapter 50, causing it to move with the second rod relative to the first rod. The rod is attached to the armature by braising or adhesive. The rod is likewise attached to the first adapter via a threaded extension end 112 and threaded guide 114. The extension end is held from turning and thereby shifting position by a locking nut 116. The extension end can be turned to fine adjust the location of the armature within the coils of the LVDT by means of an Allen wrench socket 118 adapted to allow turning of the extension end for fine armature position adjustment. This allows calibration of the position sensor assembly 66.

As will be appreciated, if the first adapter were to separate from the second tube 14, the stop nut 78 and inwardly extending flange 82 defining the off-center hole 80 would catch the first adapter and prevent it from sliding from the second tube. This redundancy is typical of the construction throughout.

With reference to FIGS. 3 and 7, in more detail the LVDT comprises a primary coil 120 wrapped around a central tube 122 and secondary coils 124, 126, also wound around the central tube. Spacers 128, 130 separate the primary coil from the two secondaries. The shield 104 comprises a tubular sheath formed of nickel-iron alloy. As the spring (FIG. 1) expands and contracts with tension and compression loading, the armature moves back and forth in the tube 122, facilitated by the low-friction properties of the Teflon sheath 108. As it does so the electrical potential in the two secondaries 124, 126 varies with position of the armature. AC power at frequencies at about 400 Hz is used. Voltage is about 28 volts RMS on the input to the primary and output through the secondaries is about −5 to +5 volts RMS in the operating range of about 307 pounds tension to 307 pounds compression load on the linkage.

Turning to FIG. 8, the potential across the primary 120 (E–F) is coupled more strongly to a first secondary 124 when the armature 106 moves toward the first secondary as the linkage and sensor assembly is comparatively loaded; and the potential across the first secondary (A–B) increases. This is at the expense of the second secondary 126, as the potential (C–D) in the second secondary falls as the armature moves away form it. In Tension loading the opposite occurs as the potential across the second secondary 126 (C–D) increases as that in the first (A–B) drops. In a preferred embodiment, the two secondaries are connected in series but wound oppositely so that the first secondary is in phase with the primary and the second secondary is 180 degrees out of phase. A common ground (G) for the primary and secondary is provided.

As the armature 106 moves toward a centralized neutral position the input voltage (E'–G) is more equally coupled through the secondary coils 124, 126 and the output through the secondary moves toward zero. This is true as at a neutral point the oppositely phased voltages from the two secondaries just cancel each other out. This position is calibrated during manufacture by adjustment of the position of the armature when no load is applied to the linkage 10 until the net output is zero. As the linkage is compressed an output voltage (A'–G) signal increases in a linear fashion as the armature moves toward the first (in phase) secondary 124.

As the linkage is tensioned, the armature moves toward the second (oppositely phased) secondary 126, and the magnitude of the secondary output voltage (A'–G) likewise linearly increases in magnitude but in a negative direction. Accordingly the RMS voltage value of the output signal indicates the magnitude of the axial force; and the sign, positive or negative, indicates compression or tension, respectively.

A calibration process in manufacture of the linkage is performed. After the position of the armature is set to provide a zero output at a no-load condition the linkage 10 is loaded to a set-point force value in compression, in one embodiment 307 pounds, and the output voltage is set at a desired value (about 4.95 VRMS) by determining the resistance across the output needed to give the desired output voltage using a variable resistance device and installing a resistor 132 across the output A'–G. This resistor is actually located in the output connector (30 in FIG. 1) of the output cable (28 in FIG. 1). The secondary output lines A' and G are twisted together to form a shielded output line and the primary input E' runs parallel to this in the output cable.

The sensor can be made more stable over a desired operational temperature range by matching the change in output of the LVDT with temperature with the change in stiffness of the spring with temperature. A drop in gain with increasing temperature for LVDT devices is well known, and is usually given by the manufacturer for off-the shelf devices and is predictable or readily ascertainable for custom devices. The change in Young's modulus for the spring with temperature is also known or readily ascertainable and depends upon the material from which it is made. As will be appreciated at higher temperatures the spring will deflect slightly more per unit of applied force, at lower temperatures, slightly less. By selection of the attributes of the LVDT these temperature effects can be made to substantially cancel each other so that indication of applied force will be more accurate, notwithstanding the fact that the spring's response changes with temperature.

As will be appreciated, the fail-safe redundant linkage and force sensor assembly 10 of the invention provides an output signal indicative of the force applied to the linkage. This can be recorded by a flight data recorder of an aircraft, for example, and can also be used in control systems, providing a force feedback signal where desirable. The sensor can be made stable over a temperature and service life range, and because of the sensitivity and ruggedness of LVDT devices a sensor incorporating such a position sensor and an elastically deformable member is currently preferred.

Other variations are possible however, and include locating the elastically deformable member inside the outer tube, for example by connecting a spring to the inside of the second tube and connecting it to the second end of the first tube. In another variation the redundant link and sensor assembly can be configured as an elongated elastically deformable member connecting the bearings of the linkage, with an outer tube closely enclosing it to provide redundancy and resistance to lateral bending, with an LVDT connected between the bearings and located within the outer tube as well, and even within an inner lumen of the elongated elastically deformable member.

In another variation, the LVDT could be replaced by another type of relative position sensor capable of generating a signal based on relative displacement of the ends of the linkage. For example, with appropriate modifications to the position sensor assembly, a variable capacitance transducer device can be used. Such devices are commercially available from Kavlico Corporation, Moorpark, Calif.

Other variations include, but are not limited to, using a hydraulically coupled linkage between the axially shifting tubes; and, increasing the stroke, and thereby the gain of the LVDT by using a hydraulic link including differing-sized cylinders for example. Moreover, the LVDT could be replaced by a pressure transducer in connection with providing a hydraulic coupling of the end bearings of the linkage. Hydraulic coupling can be accomplished using a cylinder and piston arrangement, a rolling diaphragm or a chamber having at least one diaphragm wall, to name a few examples. In this case the pressure transducer preferably will sense both positive and negative pressures, corresponding to compressive and tensile forces applied, for example.

It will be apparent from the foregoing that while particular forms of the invention have been illustrated and described, various modifications can be made without departing from the spirit and scope of the invention. Accordingly, it is not intended that the invention be limited, except by the appended claims.

We claim:

1. A fail-safe redundant linkage and sensor assembly comprising:

a first elongated metal tube having a predetermined inner and outer diameter;

a second shorter elongated metal tube having an inner diameter which is slightly greater than the outer diameter of said first tube, and said first tube extending into said second tube;

a hollow cylindrical spring having two ends and having relatively low deflection per unit of applied force, one end of said second tube being mechanically secured to one end of said spring, and the other end of said spring being mechanically secured to an intermediate location along the length of said first tube, with said first tube extending through said cylindrical spring and into said second tube to a point near the end of said second larger tube, whereby, as force is applied to said linkage, the relative longitudinal position of said first and second tubes at said point will shift;

a position sensor assembly connected between said two tubes near said point to provide an output which varies in accordance with the relative displacement of said tubes and in accordance with the force applied to said linkage, said sensor assembly being redundantly mechanically secured to said first tube, both by welding and by a transverse fastener;

a stop assembly mounted in the end of the second tube away from said spring and near said point, said stop assembly having an inwardly extending web;

said sensor assembly including positive and negative stop surfaces on opposite sides of said web, and spaced from said web by a relatively small distance corresponding to a normal range of said sensor; and whereby under normal conditions forces applied to said linkage shift the relative position of said first and second tubes and provide a variable output from said sensor, and in the event of excessive load application the spring is protected from overstressing, and in the event of the mechanical failure of any one mechanical interconnection, the linkage will still be operative.

2. A fail-safe redundant linkage and sensor assembly as defined in claim 1 wherein said position sensor is a linear variable differential transformer (LVDT).

3. A fail-safe redundant linkage and sensor assembly as defined in claim 2, wherein the LVDT is configured to provided a positive output voltage when the linkage is in compression and a negative output voltage when the linkage is in tension.

4. A fail-safe redundant linkage and sensor assembly as defined in claim 3, wherein the LVDT comprises a primary coil intermediate two secondary coils, the two secondary coils being wound oppositely so as to be 180 degrees out of phase with one another.

5. A fail-safe redundant linkage and sensor assembly as defined in claim 1 wherein said spring is a metal cylinder with a series of staggered transverse cuts to permit the length of the cylinder to change as force is applied to the ends thereof.

6. A fail-safe redundant linkage and sensor assembly as defined in claim 3, wherein the spring has a substantially linear relationship between spring deformation and applied force within the range of movement allowed it in the linkage between stops.

7. A fail-safe redundant linkage and sensor assembly as defined in claim 1 wherein first and second linkage couplings are provided at the two ends of said assembly, with said first and second couplings being secured respectively to said first and second tubes.

8. A fail-safe redundant linkage and sensor assembly as defined in claim 1 wherein said tubes are welded to said spring.

9. A fail-safe redundant linkage and sensor assembly as defined in claim 1 wherein a redundant link between the first and the second tube comprises said web defining an annular flange depending inwardly from the second tube and defining an offset opening offset from a central longitudinal axis of the linkage, and further comprises a positionally adjustable stop nut adjustably linked to the first tube, said stop nut including:
- a first annular stop flange depending outwardly so as to be able to pass through the offset opening when aligned with the offset opening but will not pass through the offset opening when the stop nut is aligned with the central longitudinal axis; and
- a second annular stop flange configured so that it will not pass through the offset opening when the stop nut is aligned with the central longitudinal axis;
- whereby the linkage can be assembled by passing the first annular stop flange through the offset opening, but thereafter, the stop nut being aligned with the central longitudinal axis, the first and second annular stop flanges cooperate with the web to limit relative axial movement of the first and second tubes.

10. A redundant linkage and sensor assembly for monitoring axial force applied to the linkage, comprising:
- a first end bearing;
- a second end bearing;
- a first mechanical force transmitting path between the first and second end bearings further comprising an elastically deformable member allowing relative movement between the first and second end bearings in directions toward and away from each other;
- a second mechanical force transmitting path configured to transmit mechanical force between the first and second end bearings, said second mechanical force transmitting path further comprising a stop assembly limiting relative movement of the first and second end bearings toward and away from each other to a first range of relative axial movement; and
- a position sensor configured to sense the change in distance between the first and second end bearings,
- whereby the applied axial forces acting through the first mechanical force transmitting path are monitorable within the first range of relative axial movement using distances between the first and second end bearings sensed by the position sensor and the deformable member, and whereby redundancy in mechanical operation of the linkage is provided by the second force transmitting path.

11. The redundant linkage and sensor assembly of claim 10, where the position sensor is a linear variable differential transformer.

12. The redundant linkage and sensor assembly of claim 11, where the RMS voltage output of the linear variable differential transformer changes sign when the direction of applied axial force on the linkage changes.

13. The redundant linkage and sensor assembly of claim 11, where the RMS voltage output of the linear variable differential transformer varies in a substantially linear fashion with respect to applied axial force.

14. The redundant linkage and sensor assembly of claim 13, where the elastically deformable member comprises a metal spring having a substantially linear relationship of axial deformation to applied force within the range of axial relative movement and the linear variable differential transformer is configured so that a change in gain of the output signal with a change in operating temperature substantially cancels out a change in spring response with the change in operating temperature, whereby increased accuracy over a range of operating temperatures is obtainable.

15. The redundant linkage and sensor assembly of claim 12, where the linear variable differential transformer has two secondary coils wound so as to be oppositely phased.

16. The redundant linkage and sensor assembly of claim 10, where the second mechanical force transmitting path comprises a first tube and an adjustable stop assembly, and where the first mechanical force transmitting path comprises a second tube coaxial with the first tube and a spring.

17. The redundant linkage and sensor assembly of claim 16, where the spring comprises a hollow cylindrical spring having two ends and having relatively low deflection per unit of applied force, the spring being coaxial with the first and second tubes.

18. A fail-safe redundant linkage and sensor assembly comprising:
- a first tube having an outer diameter and first and second ends;
- a second tube, coaxial with the first tube, having an inner diameter which is slightly greater than the outer diameter of the first tube, and first and second ends, the first tube extending into the second tube and the first end thereof being within the second tube intermediate the first and second ends of the second tube;
- an elastically deformable member connected to the first tube and to the second tube so as to allow a small amount of relative movement therebetween with elastic deformation of the elastically deformable member whereby, as an axial force is applied to said linkage, the relative longitudinal position of said first and second tubes will shift;
- a position sensor assembly connected between the first and second tubes to provide an electrical output which varies in accordance with the relative displacement of said tubes and thereby in accordance with the force applied to said linkage through relationship of deformation of the elastically deformable member to applied force, said sensor assembly being secured to said first tube;
- a stop assembly se cured to the second tube within the second tube, said stop assembly having an inwardly extending web; and said position sensor assembly including positive and negative stop surfaces on opposite sides of said web, and spaced from said web by a distance larger than that corresponding to a normal range of relative axial movement of the first and second tubes, the stop surfaces catching on the web to transmit axial force if the first and second tube move relative to one another far enough to drive the either of the stop surfaces against the web;

whereby under normal conditions forces applied to said linkage shift the relative position of said first and second tubes and provide a variable output from said sensor, and in the event of the mechanical failure of any one mechanical interconnection, the linkage will still be operative.

19. A fail-safe redundant linkage and sensor assembly as set forth in claim 18, wherein the position sensor assembly further comprises a linear variable differential transformer.

20. A fail-safe redundant linkage and sensor assembly as set forth in claim 19, wherein the output RMS voltage value of the linear variable differential transformer changes sign when the axial force on the linkage changes between tension and compression.

* * * * *